United States Patent
Tazume

(10) Patent No.: US 12,509,120 B2
(45) Date of Patent: Dec. 30, 2025

(54) UNMANNED VEHICLE AND DELIVERY SYSTEM

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 282 days.

(21) Appl. No.: 18/303,000

(22) Filed: Apr. 19, 2023

(65) Prior Publication Data
US 2023/0339511 A1 Oct. 26, 2023

(30) Foreign Application Priority Data

Apr. 25, 2022 (JP) ................................ 2022-071714

(51) Int. Cl.
*B60W 60/00* (2020.01)
*E05F 15/71* (2015.01)

(52) U.S. Cl.
CPC ....... *B60W 60/00256* (2020.02); *E05F 15/71* (2015.01); *B60W 2510/08* (2013.01); *B60W 2520/06* (2013.01); *B60W 2520/10* (2013.01); *B60W 2555/20* (2020.02); *E05Y 2201/418* (2013.01); *E05Y 2201/434* (2013.01); *E05Y 2400/31* (2013.01); *E05Y 2400/40* (2013.01); *E05Y 2400/44* (2013.01); *E05Y 2400/446* (2024.05)

(58) Field of Classification Search
None
See application file for complete search history.

(56) References Cited

U.S. PATENT DOCUMENTS

| | | |
|---|---|---|
| 10,570,656 B2 | 2/2020 | Elie et al. |
| 12,078,995 B1* | 9/2024 | Okamoto ................ G01W 1/02 |
| 2010/0154163 A1* | 6/2010 | Hoffmann ............ E05C 17/203 16/85 |
| 2017/0030128 A1* | 2/2017 | Elie ......................... B60J 5/047 |
| 2018/0162400 A1* | 6/2018 | Abdar ............. B60W 30/18009 |
| 2018/0213719 A1 | 8/2018 | Crandall et al. |
| 2018/0363353 A1* | 12/2018 | Ghannam ............ E05C 17/003 |
| 2019/0301226 A1* | 10/2019 | Kaburaki .................. E05D 3/02 |
| 2019/0301229 A1* | 10/2019 | Kitamura ................ E05D 3/127 |
| 2020/0385207 A1* | 12/2020 | Godwin ................. B60P 3/007 |

(Continued)

FOREIGN PATENT DOCUMENTS

CN 113260587 A 8/2021
DE 102017216018 A1 * 3/2019

(Continued)

OTHER PUBLICATIONS

English Translation of Chinese Office Action dated Oct. 24, 2025, issued in Chinese application No. 202310450156.9.

*Primary Examiner* — Jelani A Smith
*Assistant Examiner* — Jacob Daniel Underbakke
(74) *Attorney, Agent, or Firm* — Sughrue Mion, PLLC

(57) ABSTRACT

The unmanned vehicle for delivering an article, includes a housing portion for housing the article, the housing portion being provided with an openable and closable door, the door being closeable on a receiving surface of the article. Then, the unmanned vehicle identifies a direction of wind blown onto the unmanned vehicle; and on the basis of the identified direction of the wind, suppresses closing of the door, opened when the unmanned vehicle is stopped, due to an influence of the wind.

10 Claims, 12 Drawing Sheets

(56) References Cited

U.S. PATENT DOCUMENTS

| | | | | |
|---|---|---|---|---|
| 2021/0061091 A1* | 3/2021 | Martin | ................... | B60K 15/05 |
| 2021/0254390 A1* | 8/2021 | Kuwabara | .................. | B60J 5/04 |
| 2021/0330119 A1* | 10/2021 | Väin | ..................... | G07F 13/065 |
| 2022/0243521 A1* | 8/2022 | Herman | .................... | B60R 1/06 |
| 2023/0206166 A1* | 6/2023 | Meador | ............. | G07C 9/00309 |
| | | | | 705/333 |

FOREIGN PATENT DOCUMENTS

| | | | | | |
|---|---|---|---|---|---|
| EP | 3663771 | A1 | * | 6/2020 | |
| JP | H09319436 | A | * | 12/1997 | |
| JP | 2005-256423 | A | | 9/2005 | |
| JP | 2015183426 | A | * | 10/2015 | |
| JP | 2019-40452 | A | | 3/2019 | |
| JP | 2019-173378 | A | | 10/2019 | |
| JP | 6796613 | B2 | * | 12/2020 | ............. E05D 3/127 |
| JP | 2021033825 | A | * | 3/2021 | |
| JP | 2021-086216 | A | | 6/2021 | |
| KR | 20080025891 | A | * | 3/2008 | |
| WO | WO-2021231780 | A1 | * | 11/2021 | ............. E05F 15/77 |

\* cited by examiner

FIG. 4

CORRESPONDENCE RELATIONSHIP (EX. 1)

| WIND DIRECTION x (DEGREE) | VEHICLE DIRECTION y (DEGREE) |
|---|---|
| x → | y=x+270± α |

CORRESPONDENCE RELATIONSHIPS (EX. 2)

| WIND DIRECTION x (DEGREE) | VEHICLE DIRECTION y (DEGREE) |
|---|---|
| x → | y=x+ 90± α |
| x → | y=x+180± α |
| x → | y=x+270± α |

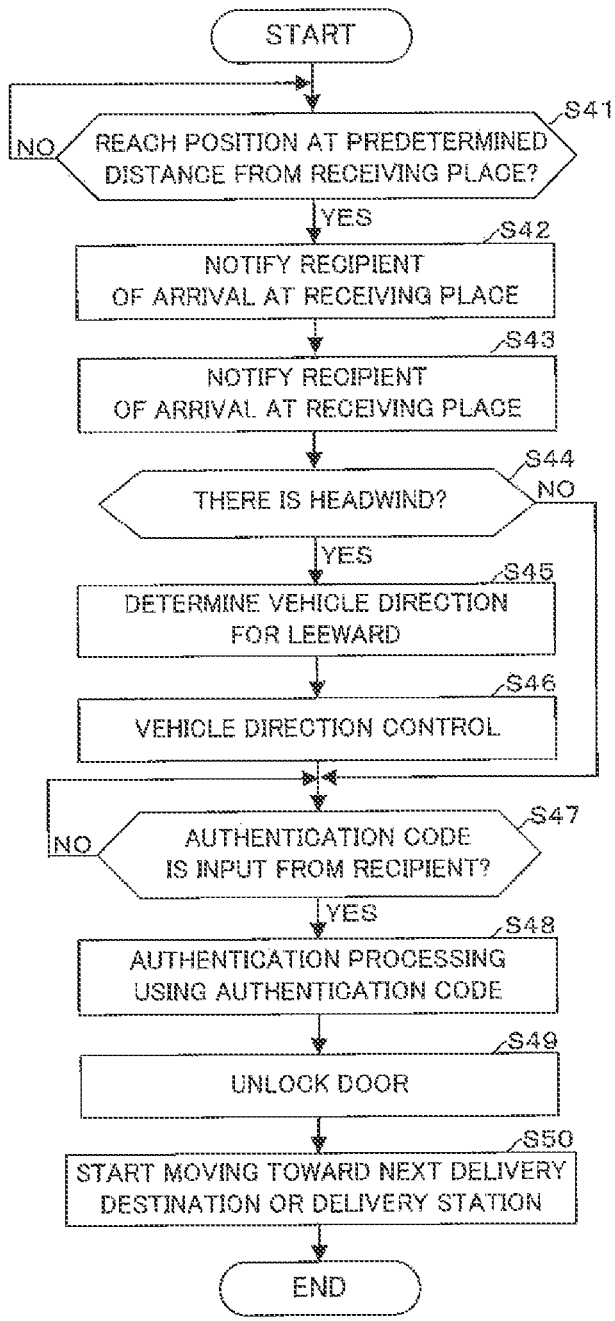

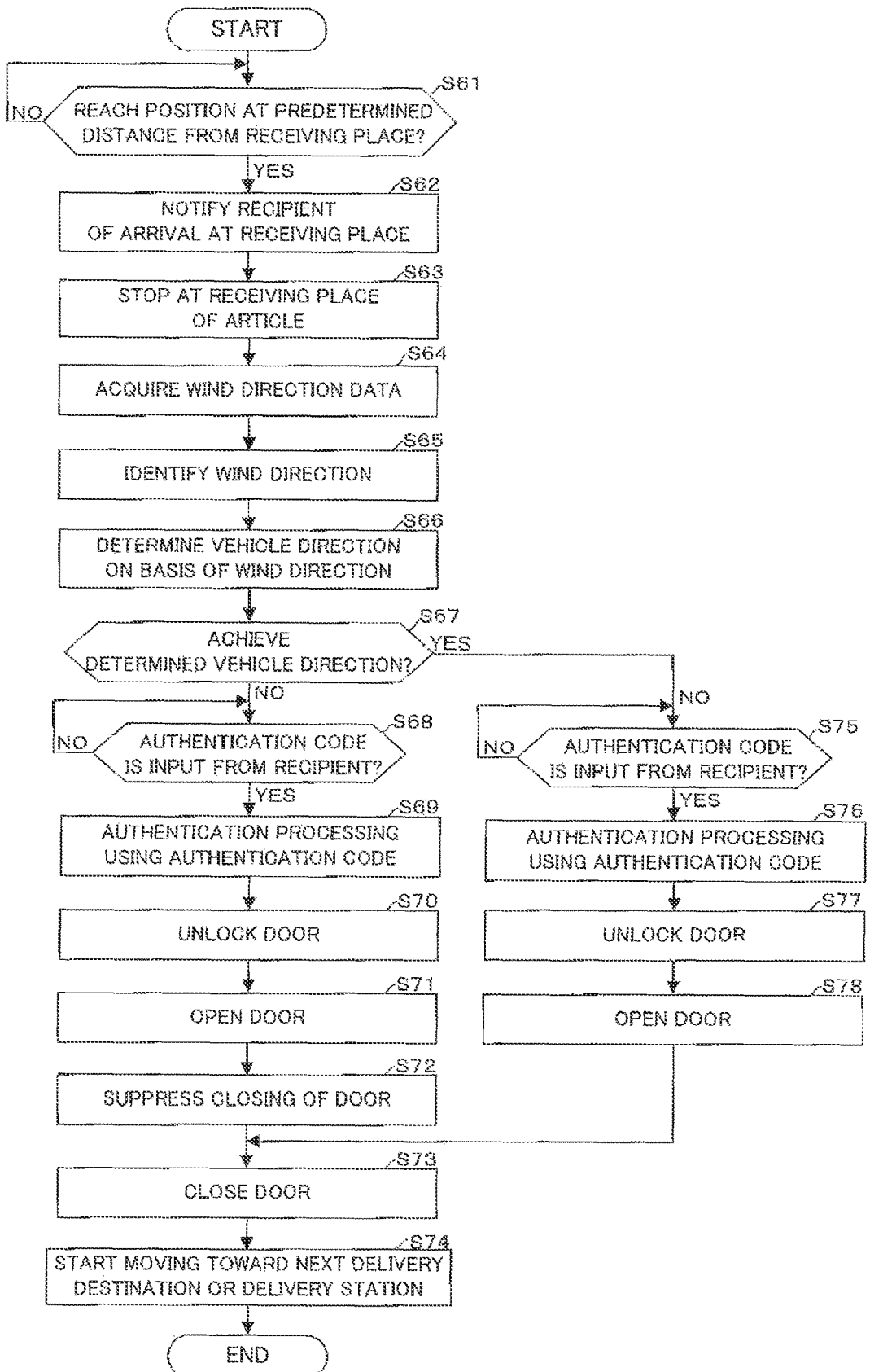

UNMANNED VEHICLE AND DELIVERY SYSTEM

CROSS REFERENCE TO RELATED APPLICATION

This application claims priority from Japanese Patent Application No. 2022-071714 which was filed on Apr. 25, 2022, the disclosure of which is herein incorporated by reference in its entirety.

TECHNICAL FIELD

One or more embodiments of the present invention relate to a technical field of a delivery system and the like for delivering an article.

RELATED ART

Conventionally, an unmanned vehicle such as a conveyance robot that delivers articles in an unmanned manner is known. For example, JP 2021-86216 A discloses a conveyance robot that conveys an article (conveyed object) to a collection site that is designated by a recipient (expected recipient) and does not get in the way of people around, and causes the recipient to collect the article. In the conveyance robot, a door is provided on a front surface of a housing portion that houses the article, and the article can be received by the recipient as the door is opened.

However, there is an issue that the door opened when the recipient is to receive an article from the unmanned vehicle is unintentionally closed due to an influence of wind, which prevents the recipient from receiving the article.

Therefore, one or more embodiments of the present invention are to providing an unmanned vehicle and a delivery system capable of suppressing unintentional closing of a door due to the influence of the wind when a recipient is to receive an article from the unmanned vehicle.

SUMMARY

In response to the above issue, an unmanned vehicle for delivering an article, includes: a housing portion for housing the article, the housing portion being provided with an openable and closable door, the door being closeable on a receiving surface of the article; at least one memory configured to store program code; and at least one processor configured to access the program code and operate as instructed by the program code. The program code includes: wind identification code configured to cause the at least one processor to identify a direction of wind blown onto the unmanned vehicle; and door closing suppression code configured to cause the at least one processor to, on the basis of the identified direction of the wind, suppress closing of the door opened when the unmanned vehicle is stopped, due to an influence of the wind.

The door closing suppression code may cause the at least one processor to control the unmanned vehicle, on the basis of the identified direction of the wind, so as to achieve a vehicle direction for suppressing closing of the door, opened when the unmanned vehicle is stopped, due to the influence of the wind.

The wind identification code may cause the at least one processor to further identify a strength of the wind blown onto the unmanned vehicle, and in a case where the strength of the wind is equal to or greater than a threshold, the door closing suppression code may cause the at least one processor to control the unmanned vehicle so as to achieve the vehicle direction for suppressing closing of the door, opened when the unmanned vehicle is stopped, due to the influence of the wind.

The program code may further include appearance direction estimation configured to cause the at least one processor to estimate an appearance direction in which a recipient of the article appears with reference to a receiving place of the article. The door closing suppression code may cause the at least one processor to control the unmanned vehicle, on the basis of the identified direction of the wind and the estimated appearance direction, so that the vehicle direction for suppressing closing of the door, opened when the unmanned vehicle is stopped, due to the influence of the wind, is achieved and so that the receiving surface faces the recipient.

The vehicle direction may be a direction in which the receiving surface is on a leeward side of a vehicle body of the unmanned vehicle in a stopped state.

The wind identification code may cause the at least one processor to identify the direction of the wind by determining whether or not the wind is a headwind with respect to the unmanned vehicle on the basis of a comparison between a ratio between output of a motor for moving the unmanned vehicle and travel speed of the unmanned vehicle, and a reference ratio, and in a case where the headwind is identified as the direction of the wind, the door closing suppression code may cause the at least one processor to control the unmanned vehicle so that the receiving surface is on the leeward side of the vehicle body of the unmanned vehicle.

The unmanned vehicle may include a door drive mechanism configured to open and close the door. The door closing suppression code may cause the at least one processor to control the door drive mechanism, on the basis of the identified direction of the wind, so as to generate torque for suppressing closing of the door, opened when the unmanned vehicle is stopped, due to the influence of the wind.

A delivery system includes: an unmanned vehicle for delivering an article; and an information processing device. The unmanned vehicle includes a housing portion for housing the article, the housing portion being provided with an openable and closable door, the door being closeable on a receiving surface of the article. The information processing device includes: at least one memory configured to store program code; and at least one processor configured to access the program code and operate as instructed by the program code. The program code includes: wind identification code configured to cause the at least one processor to identify a direction of wind blown onto the unmanned vehicle; and door closing suppression code configured to cause the at least one processor to, on the basis of the identified direction of the wind, suppress closing of the door, opened when the unmanned vehicle is stopped, due to an influence of the wind.

BRIEF DESCRIPTION OF THE DRAWINGS

FIG. 4 is a diagram illustrating correspondence relationships between wind directions and vehicle directions.

FIG. 11 is a flowchart illustrating an example of processing executed by the control unit 15 of the UGV 1 in Example 3.

FIG. 12 is a flowchart illustrating an example of processing executed by the control unit 15 of the UGV 1 in Example 4.

DETAILED DESCRIPTION

Hereinbelow, one or more embodiments of the present invention will be described with reference to the drawings. Incidentally, the following embodiment is an embodiment of a delivery system for delivering an article.

[1. Configuration of Delivery System S]

Figure 1:
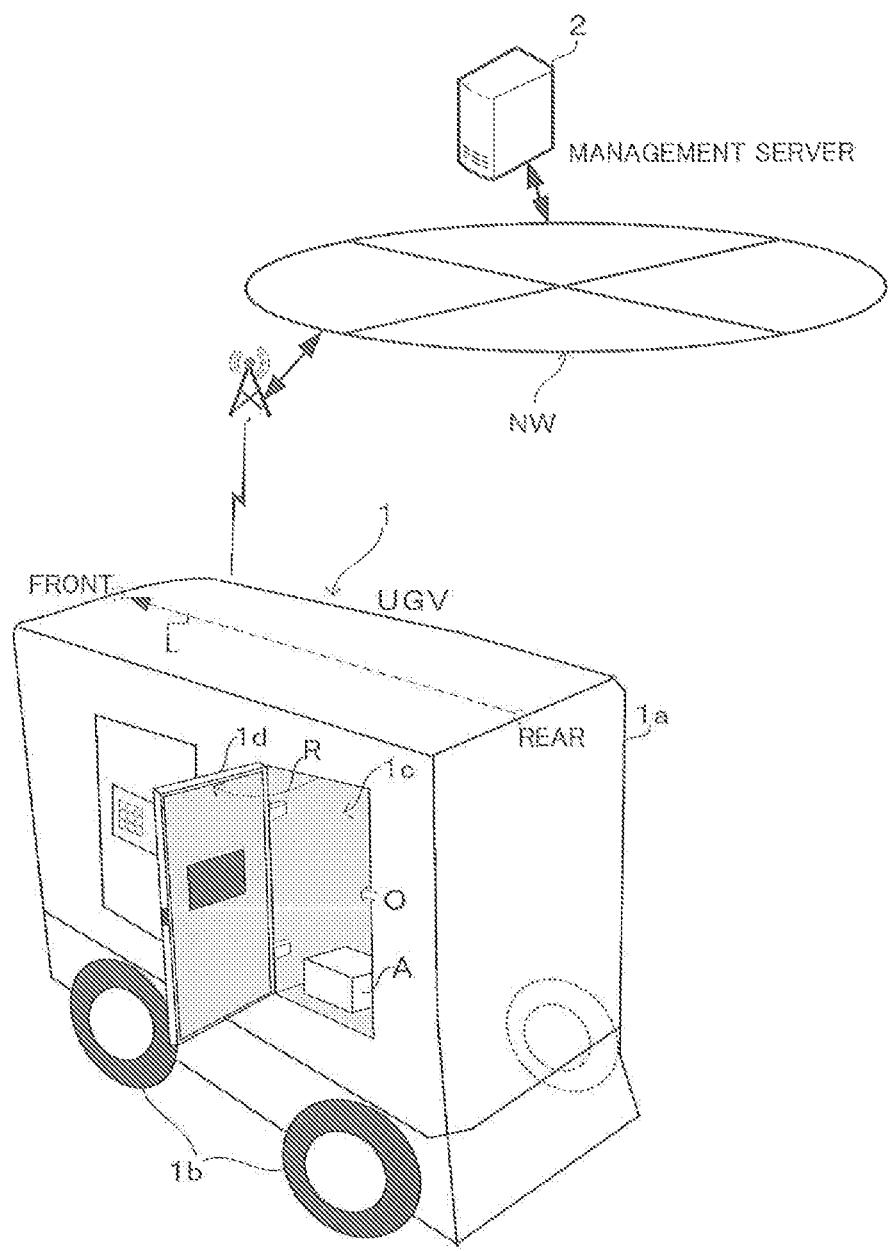
FIG. 1 is a diagram illustrating a schematic configuration example of a delivery system S.

First, a configuration of a delivery system S according to an embodiment of the present invention will be described with reference to FIG. 1. FIG. 1 is a diagram illustrating a schematic configuration example of the delivery system S. As illustrated in FIG. 1, the delivery system S includes a UGV (Unmanned Ground Vehicle) 1 and a management server 2 (an example of an information processing device), and the UGV 1 and the management server 2 are connectable to a communication network NW. The communication network NW includes the Internet, a mobile communication network and wireless base stations thereof, or the like. The UGV 1 is an example of an unmanned vehicle, has a plurality of wheels 1b, and can autonomously travel on the ground in an unmanned manner. The UGV 1 may be a robot (for example, a biped walking robot) having no wheels, or the like. The management server 2 is a server for managing and controlling delivery of articles. The management server 2 can also control the UGV 1. Moreover, the management server 2 can communicate with the UGV 1 via the communication network NW.

The article loaded on the UGV 1 as cargo (a package) is, for example, an ordered item (for example, a product or a home delivery article) ordered at an EC (Electronic commerce) website, a home delivery website, or the like. The article is transported from a delivery station to a delivery destination (shipping destination) designated by an order from a delivery requester (for example, an orderer of the product). The delivery station is a place where the article is loaded onto the UGV 1. The article is received by a recipient (for example, the delivery requester) from the UGV 1 at a receiving place near the delivery destination. The receiving place of the article is basically an outdoor place since the receiving place is a place influenced by the wind. For example, the receiving place of the article may be on a site (for example, a yard) of a house where the recipient lives, or may be on a side of a road outside the site. Moreover, in a case where the house where the recipient lives is a multiple dwelling house (for example, a condominium or an apartment), the receiving place of the article may be a place near the shared entrance. Alternatively, the receiving place of the article may be a side of a road near a building of an office where the recipient works, or may be a park, a school yard, an empty lot, or the like.

[1-1. Configuration and Functions of UGV 1]

Figure 2:
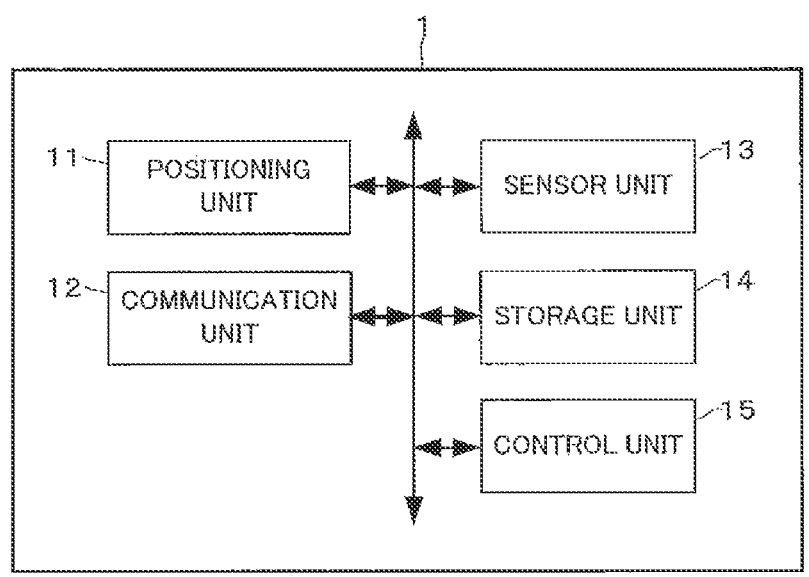
FIG. 2 is a diagram illustrating a schematic configuration example of an UGV 1.
Figure 3:
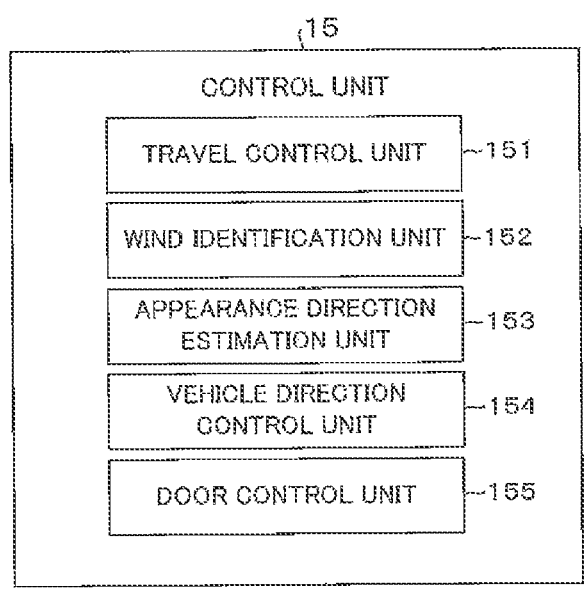
FIG. 3 is a diagram illustrating an example of functional blocks in a control unit 15.

Next, a configuration and functions of the UGV 1 will be described with reference to FIGS. 1 to 3 and the like. FIG. 2 is a diagram illustrating a schematic configuration example of the UGV 1. As illustrated in FIG. 1, the UGV 1 includes a vehicle body (casing) 1a, the plurality of wheels 1b for causing the UGV 1 to travel, one or a plurality of housing portions 1c for housing an article A, one or a plurality of openable and closable doors 1d, and the like. As illustrated in FIG. 1, the door 1d is provided at an opening portion O of the housing portion 1c. That is, the door 1d is provided so as to close (block) a receiving surface of the article A. Namely, the door 1d is closeable on the receiving surface of the article A. Incidentally, in the example of FIG. 1, the opening portion O is provided on the right side as one faces the front side (foreside) of the UGV 1, but the opening portion O may be provided on the left side, the foreside (front side), or the rear side (backside) as one faces the front side of the UGV 1. Moreover, in the example of FIG. 1, the door 1d is opened to the left, but may be opened to the right. Moreover, although not illustrated, the UGV 1 includes a wheel drive mechanism, a locking/unlocking mechanism, a door drive mechanism, and a battery. As illustrated in FIG. 2, the UGV 1 further includes a positioning unit 11, a communication unit 12, a sensor unit 13, a storage unit 14, a control unit 15, and the like.

The wheel drive mechanism includes a traveling motor (motor for moving the UGV 1), a steering motor, various shafts, various gears, a tie rod, and the like. The traveling motor and the steering motor are rotationally driven by current supplied from the battery under control of the control unit 15. Torque (rotational force) generated by the rotational driving of the traveling motor is transmitted to the shafts via the gears, whereby the wheels 1b rotate. Moreover, torque generated by the rotational driving of the steering motor is transmitted via the shafts and the tie rod, whereby the direction (steering angle) of the wheels 1b changes. Incidentally, the wheel 1b may include an omni wheel capable of turning and parallel movement in all directions.

The locking/unlocking mechanism locks/unlocks the door 1d (that is, a key provided on the door 1d) under control of the control unit 15. The door drive mechanism includes hinges or the like. Each of the hinges is secured (for example, screwed) to the housing portion 1c and the door 1d, and the door 1d is opened and closed using a connecting shaft of the hinge secured to the respective portions as a support column. For example, after the door 1d is unlocked, the recipient of the article A can hold a handle (not illustrated) provided on the front surface of the door 1d and open the door 1d to the near side (in a direction of broken line arrow R). The door drive mechanism may further include a door motor, a gear (or cam) connected to the connecting shaft of the hinge, and the like, and may open and close the door by means of the door motor. In this case, the connecting shaft is secured to the hinge at the door 1d. By current supplied from the battery, the door motor is rotated (rotated in a direction corresponding to the polarity of the current) under control of the control unit 15. Torque generated by rotational driving of the door motor is transmitted to the connecting shaft via the gear (or cam), so that the connecting shaft rotates to cause the door 1d to be automatically opened and closed.

The positioning unit 11 includes an electric wave receiver and the like. For example, the positioning unit 11 receives electric waves transmitted from a GNSS (Global Navigation Satellite System) satellite by means of the electric wave receiver, and detects the current position (latitude and longitude) of the UGV 1 on the basis of the electric waves. Incidentally, the current position of the UGV 1 may be identified by SLAM (Simultaneous Localization and Mapping) processing in addition to the electric waves transmitted from the GNSS satellite. The current position of the UGV 1 may be corrected on the basis of an image captured by a camera of the sensor unit 13. Positional information indicating the current position detected by the positioning unit 11 is output to the control unit 15. The communication unit 12 controls communication performed via the communication network NW. Moreover, the communication unit 12 may have a short-range wireless communication function such as Bluetooth (registered trademark) and perform near field communication with a user terminal (for example, a smartphone) used by the recipient of the article.

The sensor unit 13 includes a geomagnetic sensor, a motor output sensor, a travel speed sensor, an optical sensor, and a wind sensor (for example, an anemoscope or wind vane). The geomagnetic sensor detects a direction (orientation). The motor output sensor detects a motor output [W] (workload) of the traveling motor. The motor output [W] is derived from, for example, the rotational speed and torque of the traveling motor. The travel speed sensor detects a travel speed [km/h] (moving speed) of the UGV 1. The optical sensor includes, for example, a wide-angle camera such as an omnidirectional camera, and continuously images a real space within a range falling within an angle of view of the camera. The wind sensor detects a direction of wind blown onto the UGV 1 (that is, the direction of the wind hitting the UGV 1). For example, the direction of the wind having a strength equal to or higher than a set detection sensitivity is detected. Here, the direction of the wind is preferably expressed by a clockwise angle (the direction from True North to the UGV1 is 0 degrees) with respect to True North, and in this case, the direction of the wind is referred to as "a wind direction (that is, a direction from which the wind is blowing)".

Incidentally, sensing information sensed by the sensor unit 13 is output to the control unit 15, for example, and used for various types of control. The sensing information includes direction data indicating the direction detected by the geomagnetic sensor, travel speed data indicating the travel speed detected by the travel speed sensor, motor output data indicating the motor output detected by the motor output sensor, image data indicating the image captured by the optical sensor, and wind direction data indicating the wind direction detected by the wind sensor. The wind sensor may further detect the strength (hereinafter, referred to as "wind speed") of the wind blown onto the UGV 1 by measuring the pressure of the air. In this case, the sensing information includes wind speed data indicating the wind speed detected by the wind sensor. Moreover, the sensing information and a vehicle ID of the UGV 1 may be sequentially transmitted to the management server 2 by the communication unit 12.

The storage unit 14 includes a nonvolatile memory or the like, and stores various programs (program code) and data. Moreover, the storage unit 14 stores the vehicle ID of the UGV 1. The vehicle ID is identification information for identifying the UGV 1. FIG. 3 is a diagram illustrating an example of functional blocks in the control unit 15. The control unit 15 includes at least one CPU (Central Processing Unit), a ROM (Read Only Memory), a RAM (Random Access Memory), and the like. The CPU (an example of processor) is configured to access the program code stored in the ROM or the storage unit 14 and operate as instructed by the program code. The program code includes: wind identification code configured to cause the CPU to identify a direction of wind blown onto the UGV 1; and door closing suppression code configured to cause the CPU to, on the basis of the identified direction of the wind, suppress closing of the door 1*d*, opened when the UGV 1 is stopped, due to the influence of the wind. Moreover, the program code may further include appearance direction estimation configured to cause the CPU to estimate an appearance direction in which the recipient of the article appears with reference to the receiving place of the article. As illustrated in FIG. 3, the control unit 15 functions as a travel control unit 151, a wind identification unit 152, an appearance direction estimation unit 153, a vehicle direction control unit 154, a door control unit 155, and the like in accordance with the program (the program code) stored in the ROM (or the storage unit 14).

The travel control unit 151 performs control (travel control) to move the UGV 1 toward the delivery destination. In such control, a revolution speed of the wheels 1*b*, a position of the UGV 1, and a traveling direction (direction of the wheels 1*b*) of the UGV 1 are controlled with use of the positional information from the positioning unit 11, the image data from the sensor unit 13, delivery destination information, and the like. As a result, the UGV 1 can autonomously move toward the delivery destination. Incidentally, while the UGV 1 is traveling, the vehicle ID and the positional information of the UGV 1 are sequentially transmitted to the management server 2 via the communication unit 12. The delivery destination information is preferably transmitted from the management server 2 to the UGV 1 and set in the control unit 15. The delivery destination information includes, for example, an address of the delivery destination and positional information of the receiving place of the article, and such positional information is preferably expressed by latitude and longitude. The receiving place of the article may be decided by humans, or may be mechanically determined from map data including the delivery destination. In a case where an article is delivered to each of a plurality of delivery destinations, the delivery destination information is set for each delivery destination.

The wind identification unit 152 identifies the wind direction of the wind blown onto the UGV 1 (in other words, the wind direction in the peripheral area including the UGV 1) on the basis of the wind direction data from the sensor unit 13 (wind sensor). The wind direction is desirably identified while the UGV 1 is stopped at the receiving place of the article, but may be identified at a low speed (for example, 2 km/h or less) of the UGV 1. Furthermore, the wind identification unit 152 may identify the wind speed on the basis of the wind speed data from the sensor unit 13 (the wind sensor). Similar to the wind direction, the wind speed is desirably identified while the UGV 1 is stopped at the receiving place of the article, but may be identified at the low speed of the UGV 1. Moreover, the wind identification unit 152 may identify the direction of the wind blown onto the UGV 1 by using the motor output data and the travel speed data from the sensor unit 13 (the motor output sensor and the travel speed sensor) instead of the wind direction data from the sensor unit 13 (in this case, the wind sensor may not be provided in the UGV 1). The direction of the wind in this case is, for example, a direction based on the traveling direction of the UGV 1, and is identified while the UGV 1 is traveling before reaching the receiving place of the article. The wind identification unit 152 may identify the direction of the wind blown onto the UGV 1 by determining whether or not the wind is a headwind (wind in a direction opposite to the traveling direction) with respect to the UGV 1 on the basis of a comparison between a ratio (that is, the travel speed with respect to the motor output) between the motor output indicated by the motor output data and the travel speed indicated by the travel speed data, and a reference ratio.

Here, the reference ratio is, for example, a ratio (for example, 4/1), when the UGV 1 travels at a predetermined motor output (for example, 1 W) in a windless state, between the motor output and the travel speed (for example, 4 km/h), and the reference ratio is stored in the storage unit 14 in advance. The wind identification unit 152 may determine that the direction of the wind blown onto the UGV 1 is the headwind with respect to the UGV 1 in a case where the ratio (for example, 3/1) between the motor output (for example, 1 W) indicated by the motor output data and the travel speed (for example, 3 km/h) indicated by the travel speed data is lower than the reference ratio (for example, 4/1). As a result, the headwind is identified as the direction of the wind.

The appearance direction estimation unit 153 estimates an appearance direction in which the recipient of the article appears (hereinbelow, referred to as a "recipient appearance direction") with reference to the receiving place of the article. That is, it is estimated from which direction (orientation) the recipient appears at the receiving place of the article. For example, the appearance direction estimation unit 153 estimates a direction of a doorway, an entrance, or a site of the delivery destination (for example, the house) as viewed from the receiving place of the article as the recipient appearance direction. Incidentally, the doorway, the entrance, or the site of the delivery destination may be identified on the basis of the image data from the sensor unit 13, or may be identified on the basis of the map data of an area where the delivery destination is located. Alternatively, the appearance direction estimation unit 153 may estimate the recipient appearance direction by detecting (estimating) a person heading to the receiving place of the article (or the UGV 1) as the recipient on the basis of the image data from the sensor unit 13.

As an example of a door closing suppression unit, the vehicle direction control unit 154 suppresses, on the basis of the direction of the wind blown onto the UGV 1, closing of the door 1d, opened when the UGV 1 is stopped, due to the influence of the wind. More specifically, the vehicle direction control unit 154 controls the UGV 1, on the basis of the wind direction identified by the wind identification unit 152, so as to achieve a vehicle direction for suppressing closing of the door 1d, opened when the UGV 1 is stopped, due to the influence of the wind. As a result, it is possible to more effectively suppress unintentional closing of the door 1d due to the influence of the wind when the recipient is to receive the article from the UGV 1. Here, taking FIG. 1 as an example, the vehicle direction is a direction indicated by a line (broken line arrow L) from the rear end to the front end of the UGV 1, and is expressed by a clockwise angle (the direction from the UGV1 to True North is 0 degrees) with respect to True North. Incidentally, the vehicle direction may be a direction indicated by a line from the front end to the rear end of the UGV 1. When the UGV 1 arrives at the receiving place of the article, the vehicle direction control unit 154 preferably determines the vehicle direction for suppressing, on the basis of the wind direction identified by the wind identification unit 152, closing of the door 1d, opened when the UGV 1 is stopped, due to the influence of the wind. Here, the vehicle direction is determined on the basis of, for example, a calculation formula or a table that defines correspondence relationships between the wind directions and the vehicle directions. Such correspondence relationships are preferably appropriately set by an administrator or the like of the delivery system S.

FIG. 4 is a diagram illustrating the correspondence relationships between the wind directions and the vehicle directions. In FIG. 4, "x" represents the wind direction (angle), "y" represents the vehicle direction (angle), and "α" represents an arbitrarily determined angle (for example, any angle out of 0 to 10 degrees). In the correspondence relationship (Ex. 1) illustrated in FIG. 4, the wind direction and the vehicle direction are in a one-to-one relationship and are in a relationship in which the receiving surface of the article is on the leeward side of the vehicle body 1a of the UGV 1. For example, in a case where the wind direction x=0 (wind from the north), the vehicle direction y=270 (west direction) is calculated (where α=0) and determined by a calculation formula (y=x+270±α) of the correspondence relationship (Ex. 1). Incidentally, in a case where "y>360", the vehicle direction is calculated from "y−360". On the other hand, in the correspondence relationships (Ex. 2) illustrated in FIG. 4, the wind direction and the vehicle directions are in a one-to-N (N is an integer of 2 or more) relationships. For example, in a case where the wind direction x=0 (wind from the north), the vehicle direction y=90 (east direction), the vehicle direction y=180 (south direction), and the vehicle direction y=270 (west direction) are calculated by respective calculation formulas of the correspondence relationships (Ex. 2) (where α=0).

As illustrated in the correspondence relationships (Ex. 2) in FIG. 4, in a case where the plurality of vehicle directions capable of suppressing door closing for the wind direction are calculated, one optimum vehicle direction is determined out of these vehicle directions. The optimum vehicle direction is, for example, a vehicle direction in which the receiving surface of the article is on the leeward side of the vehicle body 1a of the UGV 1. Alternatively, in a case where an obstacle is detected around the receiving place of the article from the image data, a vehicle direction that is least susceptible to the influence of the obstacle in receiving the article is determined as the optimum vehicle direction. The vehicle direction that is least susceptible to the influence of the obstacle is, for example, a vehicle direction in which the receiving surface of the article (opening portion O) is located on the opposite side of the obstacle with the vehicle body 1a interposed therebetween. Incidentally, since the vehicle direction capable of suppressing door closing for the wind direction differs depending on whether the opening portion O is provided on the right side or on the left side as one faces the front side of the UGV 1, the aforementioned correspondence relationships are set in consideration of such a point. Furthermore, since the vehicle direction capable of suppressing door closing for the wind direction differs depending on whether the door 1d is opened to the left or to the right, the aforementioned correspondence relationships are set in consideration of such a point.

Then, the vehicle direction control unit 154 outputs a control command corresponding to the determined vehicle direction to the wheel drive mechanism to rotate the wheels 1b and change the direction of the wheels 1b, thereby causing the UGV 1 to face in the determined vehicle direction. Such control is referred to as "vehicle direction control". Incidentally, in a case where the vehicle direction is expressed as a range such as 90±5 degrees, the vehicle direction control unit 154 preferably performs the vehicle direction control so that the vehicle direction may fall within such a range. Moreover, since it is also assumed that the wind speed is not so high as to close the door 1*d*, the vehicle direction control unit 154 may perform the vehicle direction control so as to achieve the determined vehicle direction in a case where the wind speed identified by the wind identification unit 152 is equal to or higher than a threshold. As a result, it is possible to suppress unintentional closing of the door 1*d* depending on the strength of the wind when the recipient is to receive the article from the UGV 1. The threshold is preferably appropriately set on the basis of the relationships between loads for opening and closing the door 1*d* and wind speeds, which has been investigated in advance. Incidentally, in a case where the UGV 1 is already in the determined vehicle direction, it is not necessary to perform the vehicle direction control.

Figure 5:
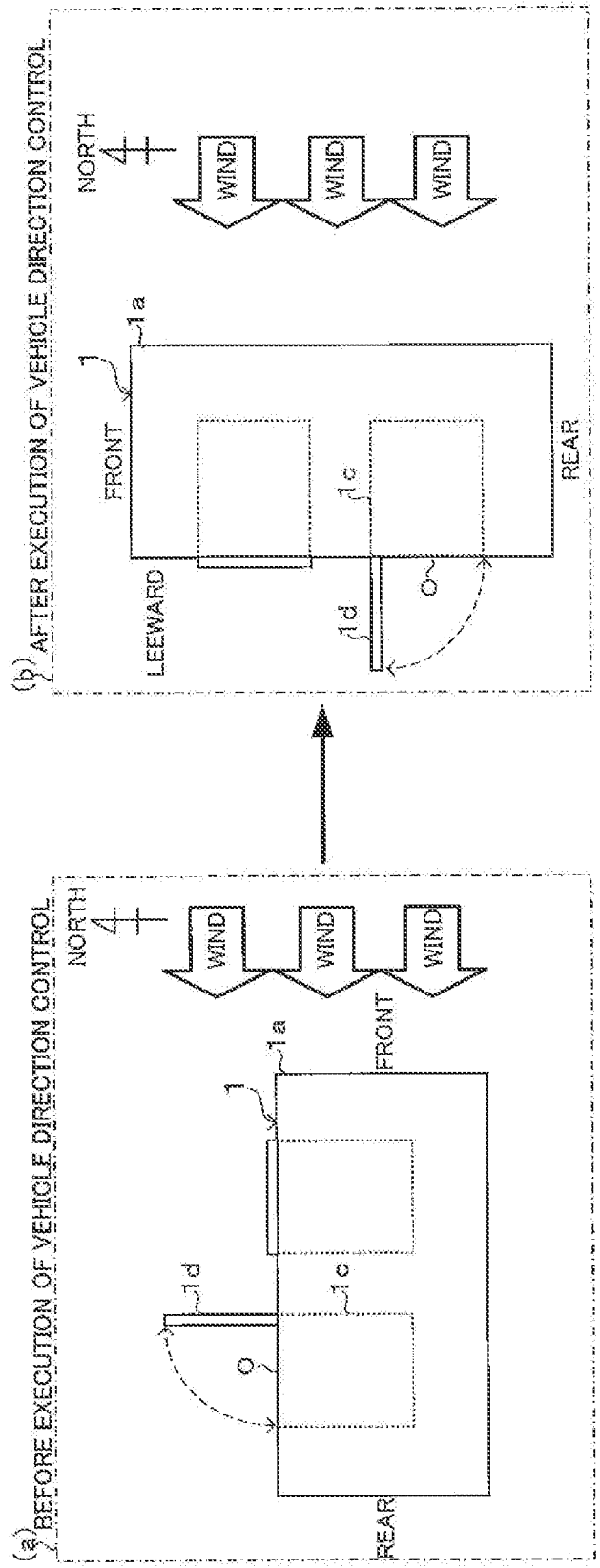
FIG. 5 is a conceptual diagram illustrating a state in which a vehicle direction control of the UGV 1 is performed.

FIG. 5 is a conceptual diagram illustrating a state in which the vehicle direction control of the UGV 1 is performed. In the example in frame (a) of FIG. 5, before the execution of the vehicle direction control, while the UGV 1 is stopped at the receiving place of the article, the wind direction is the wind from the east, whereas the vehicle direction is the east direction. Therefore, it is not possible to suppress unintentional closing of the opened door 1*d*, due to the influence of the wind. On the other hand, in the example in frame (b) of FIG. 5, after the execution of the vehicle direction control, while the UGV 1 is stopped at the receiving place of the article, the wind direction is the wind from the east, whereas the vehicle direction is the north direction. Therefore, it is possible to suppress unintentional closing of the opened door 1*d*, due to the influence of the wind. The vehicle direction in this case is a direction in which the receiving surface of the article (opening portion O) is on the leeward side of the vehicle body 1*a* of the UGV 1 in the stopped state. Therefore, the wind can be blocked by the vehicle body 1*a*, and this case is the most effective in suppressing unintentional closing of the door 1*d*, due to the influence of the wind.

Moreover, the vehicle direction control unit 154 preferably performs the vehicle direction control, on the basis of the wind direction identified by the wind identification unit 152, so that the vehicle direction for suppressing closing of the door 1*d*, opened when the UGV 1 is stopped, due to the influence of the wind is achieved and so that the receiving surface of the article faces the recipient side and the recipient appearance direction estimated by the appearance direction estimation unit 153. In this case, the vehicle direction in which closing of the door 1*d*, opened when the UGV 1 is stopped, due to the influence of the wind is suppressed and in which the receiving surface of the article faces the recipient side is determined, and the control command corresponding to the vehicle direction is output to the wheel drive mechanism. As a result, it is possible to suppress unintentional closing of the door 1*d* due to the influence of the wind when the recipient is to receive the article from the UGV 1, and to suppress extension of a flow line of the recipient to the receiving surface of the article, and eventually, it is possible to suppress the deterioration in convenience for the recipient.

Figure 6:
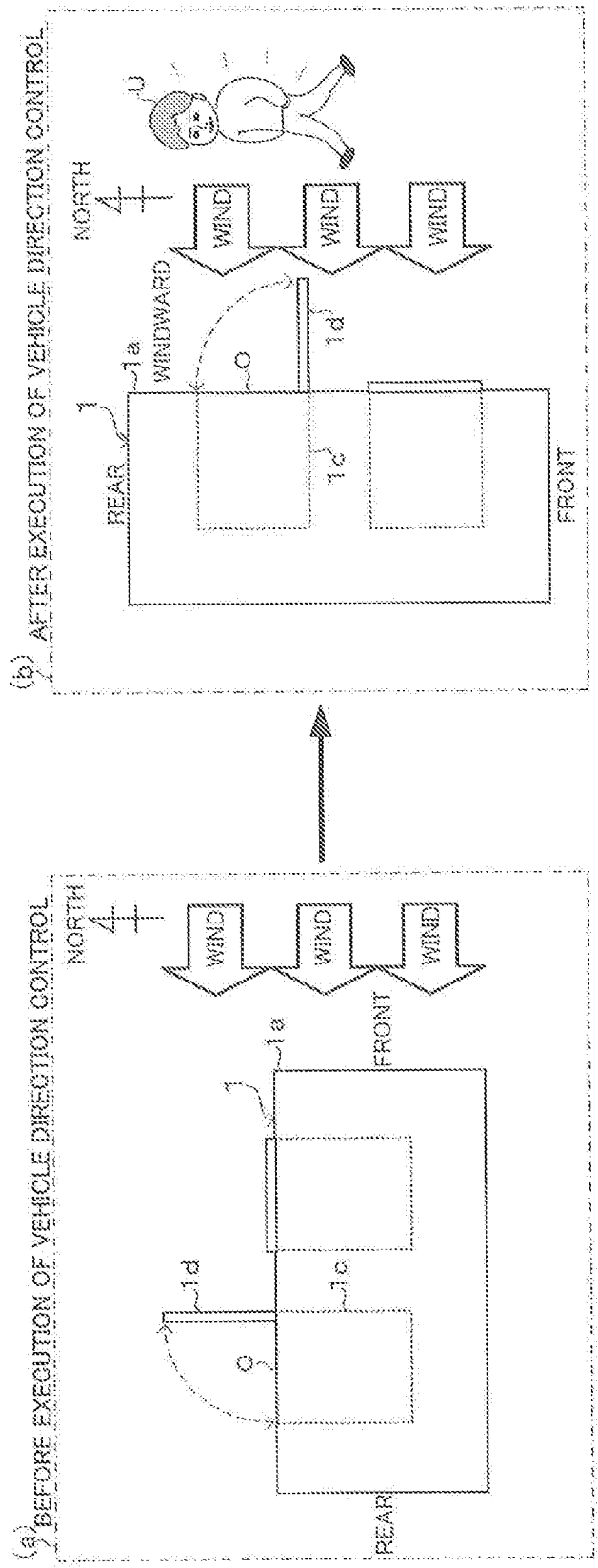
FIG. 6 is a conceptual diagram illustrating a state in which the vehicle direction control of the UGV 1 is performed in consideration of a recipient appearance direction.

FIG. 6 is a conceptual diagram illustrating a state in which the vehicle direction control of the UGV 1 is performed in consideration of the recipient appearance direction. In the example in frame (a) of FIG. 6, before the execution of the vehicle direction control, while the UGV 1 is stopped at the receiving place of the article, the wind direction is the wind from the east, whereas the vehicle direction is the east direction (similar to the example in frame (a) of FIG. 5). Incidentally, in the example in frame (a) of FIG. 6, it is assumed that the recipient appearance direction is estimated to be the front side of the UGV 1. On the other hand, in the example in frame (b) of FIG. 6, after the execution of the vehicle direction control, while the UGV 1 is stopped at the receiving place of the article, the wind direction is the wind from the east, whereas the vehicle direction is the south direction so that the receiving surface of the article (opening portion O) faces the recipient U. Therefore, it is possible to suppress the deterioration of the convenience for the recipient U while suppressing unintentional closing of the opened door 1*d*, due to the influence of the wind. However, the vehicle direction in this case is a direction in which the receiving surface of the article is on the windward side of the vehicle body 1*a* of the UGV 1 in the stopped state. Therefore, the wind cannot be blocked by the vehicle body 1*a*, but the vehicle direction is effective in suppressing unintentional closing of the door 1*d* due to the influence of the wind when the door 1*d* is open at 90 degrees or more (that is, when the recipient U receives the article).

On the other hand, in a case where the headwind is determined as the direction of the wind by the wind identification unit 152, the vehicle direction control unit 154 performs the vehicle direction control so that the receiving surface of the article is on the leeward side of the vehicle body 1*a* of the UGV 1 in the stopped state. That is, the control is performed such that the vehicle direction intersects the traveling direction of the UGV 1. In this case, the vehicle direction in which the receiving surface of the article is on the leeward side of the vehicle body 1*a* is determined, and the control command corresponding to the vehicle direction is output to the wheel drive mechanism. As a result, it is possible to suppress unintentional closing of the door 1*d* due to the influence of the wind with a simple configuration without using the wind sensor.

Figure 7:
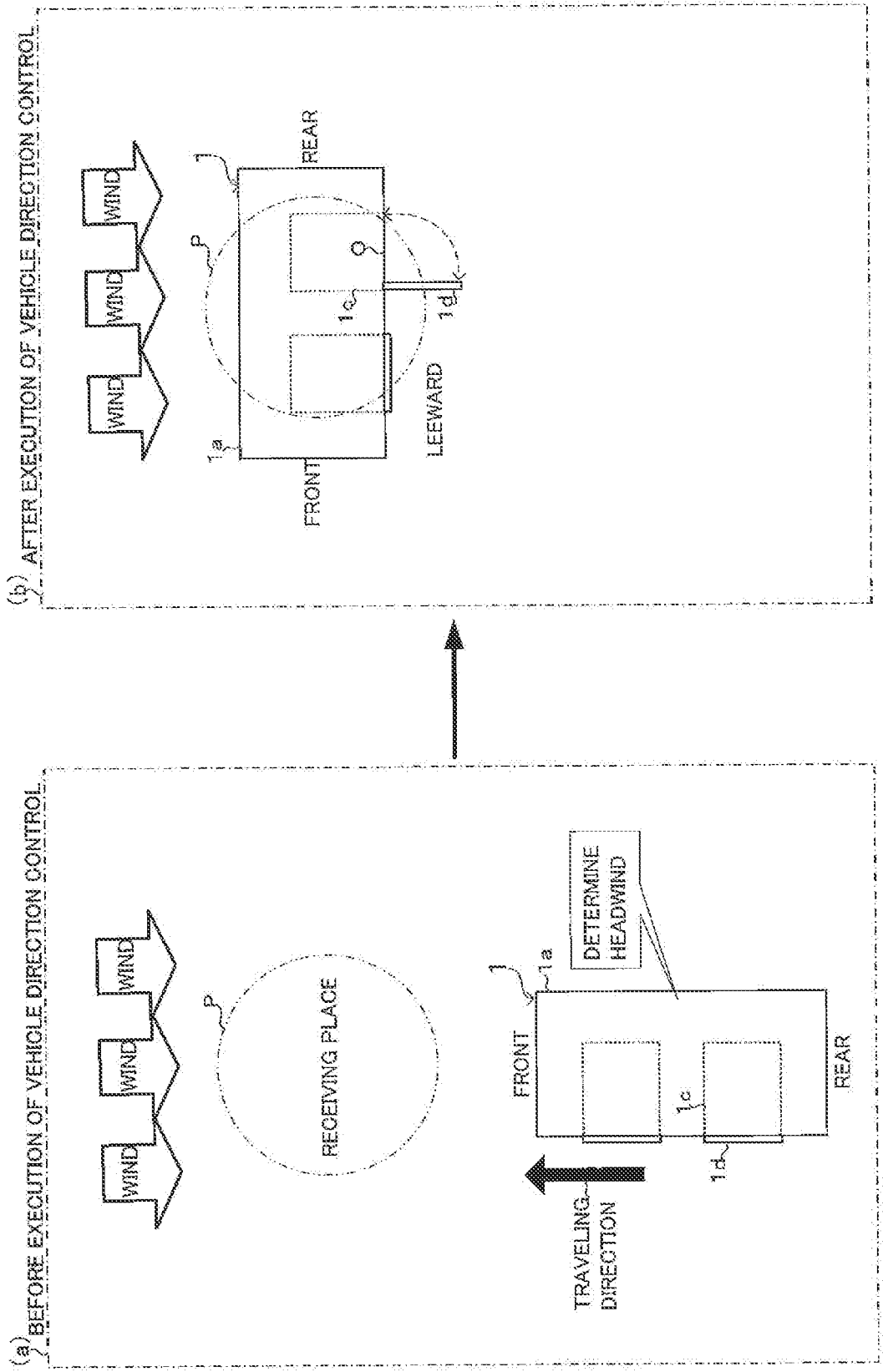
FIG. 7 is a conceptual diagram illustrating a state in which the vehicle direction control of the UGV 1 is performed in a case where a headwind is determined.

FIG. 7 is a conceptual diagram illustrating a state in which the vehicle direction control of the UGV 1 is performed in a case where the headwind is determined. In the example in frame (a) of FIG. 7, before the execution of the vehicle direction control, the headwind is determined before the traveling UGV 1 reaches a receiving place P located in the traveling direction. Therefore, in a case where the UGV 1 stops and the door 1*d* is opened in this state of the vehicle direction (that is, the state where the vehicle is against the headwind), it is not possible to suppress unintentional closing of the opened door 1*d*, due to the influence of the wind. On the other hand, in the example in frame (b) of FIG. 7, after the execution of the vehicle direction control, the receiving surface of the article is on the leeward side of the vehicle body 1*a* of the UGV 1 (the UGV 1 in the stopped state at the receiving place P). Therefore, it is possible to suppress unintentional closing of the opened door 1*d*, due to the influence of the wind.

In a state where the UGV 1 is stopped at the receiving place of the article after the execution of the vehicle direction control, when an authentication code for unlocking the door 1*d* (that is, releasing the lock of the door 1*d*) is input from the recipient, the door control unit 155 performs authentication processing using the input authentication code and an authentication code registered in advance. Incidentally, the authentication code from the recipient may be input from an operation panel provided on the front surface of the door 1*d* or may be input from the user terminal of the recipient via the near field communication. In a case where the authentication is successful (for example, both the authentication codes match) in the authentication processing, the door control unit 155 outputs a control command for unlocking the door 1*d* to the locking/unlocking mechanism to perform unlocking. As a result, the recipient can open the door 1*d* and easily take out the article from the housing portion 1*c* under a situation where closing of the door 1*d* is suppressed due to the influence of the wind. Incidentally, in a case where there is no risk of theft or the like of the article (for example, in a case where the delivery destination is in a specific company), the door 1*d* may be openable without performing the authentication processing.

Moreover, in a case where the door drive mechanism can open and close the door 1*d* by means of the door motor, the door control unit 155 may unlock the door 1*d* and then output a control command for opening the door 1*d* to the door drive mechanism to open the door 1*d*. Furthermore, in this case, as an example of the door closing suppression unit, the door control unit 155 may suppress, on the basis of the wind direction identified by the wind identification unit 152, closing of the door 1*d*, opened when the UGV 1 is stopped, due to the influence of the wind. More specifically, the door control unit 155 controls the door drive mechanism (door drive mechanism control), on the basis of the wind direction identified by the wind identification unit 152, so as to generate torque for suppressing closing of the door 1*d*, opened when the UGV 1 is stopped, due to the influence of the wind. As a result, it is possible to suppress unintentional closing of the door 1*d* due to the influence of the wind when the recipient is to receive the article from the UGV 1 without changing the vehicle direction by means of the vehicle direction control.

Here, the torque for suppressing closing of the door 1*d* is torque for rotating the connecting shaft of the hinge in a direction for suppressing closing of the door 1*d* (in other words, a direction in which the door 1*d* opens). The torque is generated as the control command for suppressing closing of the door 1*d* is output from the door control unit 155 to the door drive mechanism to cause the door motor to be rotationally driven. The degree of torque to be generated is preferably appropriately set on the basis of the relationships between the loads for opening and closing the door 1*d* and the wind speeds. Moreover, the door control unit 155 may control the door drive mechanism such that larger torque is generated as the wind speed is higher (larger). Incidentally, the control of the door drive mechanism is performed by adjusting the magnitude of the current supplied to the door motor.

[1-2. Configuration and Functions of Management Server 2]

Figure 8:
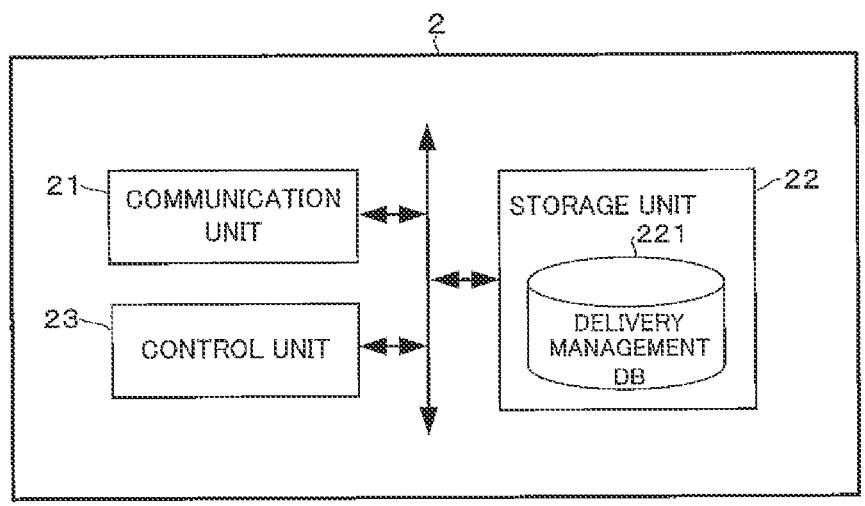
FIG. 8 is a diagram illustrating a schematic configuration example of a management server 2.

Next, a configuration and functions of the management server 2 will be described with reference to FIG. 8. FIG. 8 is a diagram illustrating a schematic configuration example of the management server 2. As illustrated in FIG. 8, the management server 2 includes a communication unit 21, a storage unit 22, a control unit 23, and the like. The communication unit 21 controls communication performed via the communication network NW. The positional information and the vehicle ID transmitted from the UGV 1 are received by the communication unit 21. The management server 2 can recognize the current position of the UGV 1 from the positional information of the UGV 1. Moreover, the sensing information and the vehicle ID transmitted from the UGV 1 are received by the communication unit 21. The storage unit 22 includes, for example, a hard disk drive, and stores various programs and data.

Moreover, in the storage unit 22, a delivery management database 221 and the like are constructed. The delivery management database 221 is a database for managing information related to delivery of the articles. In the delivery management database 221, vehicle information, the delivery destination information, recipient information, and the like are stored (registered) in association with each other. Here, the vehicle information includes information regarding the UGV 1 that delivers the article (for example, the vehicle ID). The recipient information includes a user ID for identifying the recipient of the article, an e-mail address or a telephone number of the recipient, and the like. The control unit 23 includes at least one CPU, a ROM, a RAM, and the like. The control unit 23 monitors the current position of the UGV 1 and controls the UGV 1 by appropriately transmitting a control command to the UGV 1. Such control may include at least one of the travel control, the vehicle direction control, and door control of the UGV 1.

For example, instead of the control unit 15, the control unit 23 may identify the wind direction on the basis of the wind direction data from the UGV 1, determine the vehicle direction for suppressing, on the basis of the wind direction, closing of the door 1*d*, opened when the UGV 1 is stopped, due to the influence of the wind, and transmit a control command corresponding to the vehicle direction to the UGV 1 to control the UGV 1 (vehicle direction control). Furthermore, the control unit 23 may estimate the above-described recipient appearance direction instead of the control unit 15. In this case, the control unit 23 determines, on the basis of the wind direction and the recipient appearance direction, the vehicle direction for suppressing closing of the door 1*d*, opened when the UGV 1 is stopped, due to the influence of the wind and for causing the receiving surface of the article to face the recipient side, and transmits the control command corresponding to the vehicle direction to the UGV 1 to control the UGV 1 (vehicle direction control).

Alternatively, instead of the control unit 15, the control unit 23 may determine whether or not there is the headwind with respect to the UGV 1 on the basis of the comparison between the ratio between the motor output indicated by the motor output data and the travel speed indicated by the travel speed data from the UGV 1, and the reference ratio, thereby identifying the direction of the wind blown onto the UGV 1. In this case, the control unit 23 determines the vehicle direction in which the receiving surface of the article is on the leeward side of the vehicle body 1*a* of the UGV 1, and transmits the control command corresponding to the vehicle direction to the UGV 1 to control the UGV 1 (vehicle direction control). Alternatively, instead of the control unit 15, the control unit 23 may transmit, to the UGV 1, a control command for generating torque for suppressing, on the basis of the wind direction to control the UGV 1 (door drive mechanism control), closing of the door 1*d*, opened when the UGV 1 is stopped, due to the influence of the wind.

[2. Operation of Delivery System S]

Next, operations of the delivery system S will be described in Examples 1 to 4.

Example 1

Figure 9:
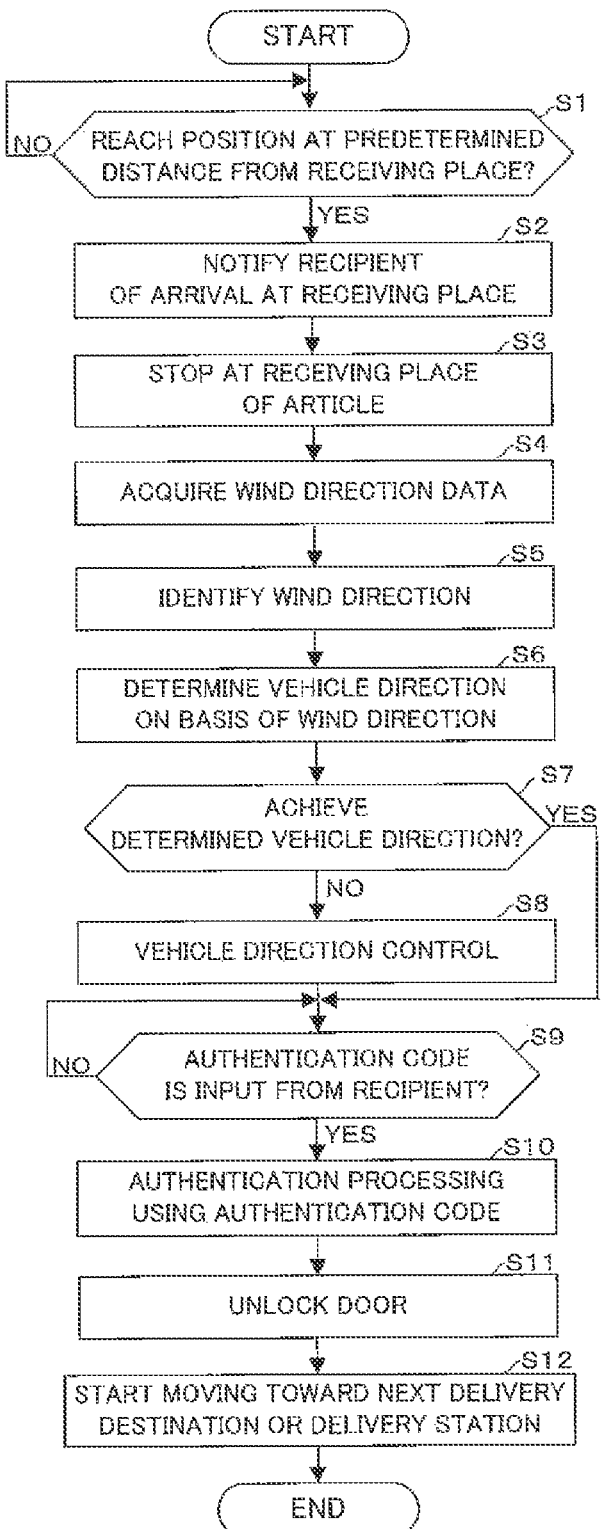
FIG. 9 is a flowchart illustrating an example of processing executed by the control unit 15 of the UGV 1 in Example 1.

First, an operation of the delivery system S in Example 1 will be described with reference to FIG. 9. FIG. 9 is a flowchart illustrating an example of processing executed by the control unit 15 of the UGV 1 in Example 1. The processing illustrated in FIG. 9 is started when the UGV 1 that loads the article starts delivery from the delivery station.

When the processing illustrated in FIG. 9 is started, the control unit 23 determines whether or not the UGV 1 has arrived at a position at a predetermined distance (for example, 5 to 30 m) from the receiving place of the article (step S1). In a case where it is determined that the UGV 1 has arrived at the position at the predetermined distance from the receiving place of the article (step S1: YES), the processing proceeds to step S2. On the other hand, in a case where it is determined that the UGV 1 has not arrived at the position at the predetermined distance from the receiving place of the article (step S1: NO), the processing returns to step S1.

In step S2, the control unit 15 notifies the recipient that the article has arrived at the receiving place (or that the article has arrived immediately near the receiving place) on the basis of the recipient information acquired in advance from the management server 2. For example, the control unit 15 transmits an e-mail including a message indicating that the article has arrived at the receiving place to the e-mail address of the recipient. Alternatively, the control unit 15 may transmit the message to the telephone number of the recipient by means of SMS (Short Message Service). Alternatively, the control unit 15 may push the message to an application resident in the user terminal of the recipient. Incidentally, the notification that the article has arrived at the receiving place may be performed by the management server 2.

Subsequently, the control unit 15 stops the UGV 1 at the receiving place of the article (step S3). As a result, the UGV 1 stops, for example, while maintaining the vehicle direction in which the UGV 1 travels toward the receiving place of the article. Subsequently, the control unit 15 acquires the wind direction data from the sensor unit 13 (wind sensor) (step S4). Subsequently, the control unit 15 causes the wind identification unit 152 to identify the wind direction on the basis of the wind direction data acquired in step S4 (step S5), and advances the processing to step S6.

Incidentally, in steps S4 and S5, the control unit 15 may further acquire the wind speed data from the sensor unit 13 (wind sensor) and identify the wind speed on the basis of the wind speed data. In this case, the control unit 15 determines whether or not the wind speed is equal to or higher than the threshold. Then, in a case where it is determined that the wind speed is equal to or higher than the threshold, the processing proceeds to step S6. On the other hand, in a case where it is determined that the wind speed is not equal to or higher than the threshold, the vehicle direction is not determined and controlled, and the processing proceeds to step S9.

In step S6, based on the wind direction identified in step S5, the control unit 15 causes the vehicle direction control unit 154 to determine the vehicle direction for suppressing closing of the door 1d due to the influence of the wind as described above. Subsequently, the control unit 15 determines whether or not the UGV 1 is in the vehicle direction determined in step S6 (step S7). In a case where it is determined that the UGV 1 is not in the vehicle direction determined in step S6 (step S7: NO), the processing proceeds to step S8. On the other hand, in a case where it is determined that the UGV 1 is already in the vehicle direction determined in step S6 (step S7: YES), the control of the vehicle direction is not performed, and the processing proceeds to step S9.

In step S8, the control unit 15 performs the vehicle direction control by outputting a control command corresponding to the vehicle direction determined in step S6 to the wheel drive mechanism by means of the vehicle direction control unit 154. As a result, for example, as illustrated in FIG. 5, the UGV 1 changes the direction at the receiving place of the article so as to have the determined vehicle direction.

In step S9, the control unit 15 determines whether or not the authentication code is input from the recipient. In a case where it is determined that the authentication code is input from the recipient (step S9: YES), the processing proceeds to step S10. On the other hand, in a case where it is determined that the authentication code is not input from the recipient (step S9: NO), the processing returns to step S9. Incidentally, in a case where the authentication code is not input from the recipient even after a predetermined time has elapsed from the execution of the vehicle direction control, the UGV 1 may start moving toward the next delivery destination or the delivery station.

In step S10, the control unit 15 performs the authentication processing using the input authentication code and the authentication code registered in advance. When the authentication is successful in the authentication processing, the control unit 15 outputs a control command for unlocking the door 1d to the locking/unlocking mechanism by means of the door control unit 155 to perform unlocking (step S11). As a result, the recipient can open the door 1d and easily take out the article from the housing portion 1c. Incidentally, after unlocking the door 1d, the control unit 15 may cause the door 1d to be automatically opened by outputting a control command for opening the door 1d to the door drive mechanism by means of the door control unit 155. Subsequently, when the article is received by the recipient and the door 1d is closed, the control unit 15 starts moving the UGV 1 toward the next delivery destination or the delivery station (step S12).

Example 2

Figure 10:
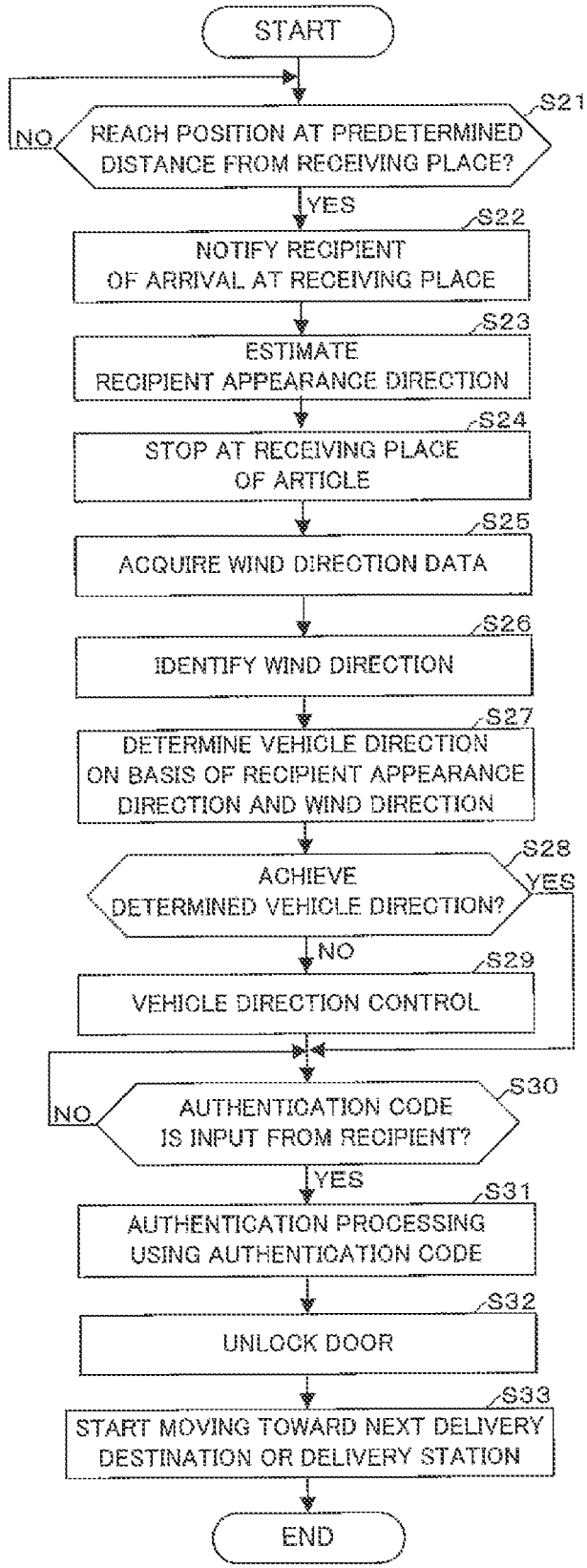
FIG. 10 is a flowchart illustrating an example of processing executed by the control unit 15 of the UGV 1 in Example 2.

Next, an operation of the delivery system S in Example 2 will be described with reference to FIG. 10. FIG. 10 is a flowchart illustrating an example of processing executed by the control unit 15 of the UGV 1 in Example 2. Incidentally, the processing in steps S21 and S22 illustrated in FIG. 10 is similar to the processing in steps S1 and S2 illustrated in FIG. 9.

In step S23, the control unit 15 estimates the recipient appearance direction in which the recipient appears with reference to the receiving place of the article by means of the appearance direction estimation unit 153. Subsequently, the control unit 15 stops the UGV 1 at the receiving place of the article (step S24). As a result, the UGV 1 stops, for example, while maintaining the vehicle direction in which the UGV 1 travels toward the receiving place of the article. Subsequently, the control unit 15 acquires the wind direction data from the sensor unit 13 (wind sensor) (step S25). Subsequently, the control unit 15 causes the wind identification unit 152 to identify the wind direction on the basis of the wind direction data acquired in step S25 (step S26), and advances the processing to step S27.

Incidentally, in steps S25 and S26, the control unit 15 may further acquire the wind speed data from the sensor unit 13 (wind sensor) and identify the wind speed on the basis of the wind speed data. In this case, the control unit 15 determines whether or not the wind speed is equal to or higher than the threshold. Then, in a case where it is determined that the wind speed is equal to or higher than the threshold, the processing proceeds to step S27. On the other hand, in a case where it is determined that the wind speed is not equal to or higher than the threshold, the vehicle direction is not determined and controlled, and the processing proceeds to step S30.

In step S27, based on the recipient appearance direction estimated in step S23 and the wind direction identified in step S26, the control unit 15 causes the vehicle direction control unit 154 to determine the vehicle direction for suppressing closing of the door 1d due to the influence of the wind and for causing the receiving surface of the article to face the recipient side as described above. Subsequently, the control unit 15 determines whether or not the UGV 1 is in the vehicle direction determined in step S27 (step S28). In a case where it is determined that the UGV 1 is not in the vehicle direction determined in step S27 (step S28: NO), the processing proceeds to step S29. On the other hand, in a case where it is determined that the UGV 1 is already in the vehicle direction determined in step S27 (step S28: YES), the control of the vehicle direction is not performed, and the processing proceeds to step S30.

In step S29, the control unit 15 performs the vehicle direction control by outputting a control command corresponding to the vehicle direction determined in step S27 to the wheel drive mechanism by means of the vehicle direction control unit 154. As a result, for example, as illustrated in FIG. 6, the UGV 1 changes the direction at the receiving place of the article so as to have the determined vehicle direction. Incidentally, the processing in steps S30 to S33 illustrated in FIG. 10 is similar to the processing in steps S9 to S12 illustrated in FIG. 9.

Example 3

Next, an operation of the delivery system S in Example 3 will be described with reference to FIG. 11. FIG. 11 is a flowchart illustrating an example of processing executed by the control unit 15 of the UGV 1 in Example 3. Incidentally, the processing in steps S41 and S42 illustrated in FIG. 11 is similar to the processing in steps S1 and S2 illustrated in FIG. 9.

In step S43, the control unit 15 acquires the motor output data and the travel speed data from the sensor unit 13 (motor output sensor and travel speed sensor) while the UGV 1 is traveling. Subsequently, the control unit 15 determines whether or not there is a headwind with respect to the UGV 1 on the basis of the comparison between the ratio between the motor output indicated by the motor output data and the travel speed indicated by the travel speed data acquired in step S43, and the reference ratio (step S44).

For example, in a case where the ratio between the motor output indicated by the motor output data and the travel speed indicated by the travel speed data is lower than the reference ratio, it is determined that there is a headwind. Alternatively, in a case where a value obtained by subtracting the ratio between the motor output and the travel speed from the reference ratio is higher than a threshold value, it may be determined that there is a headwind. In a case where it is determined that there is a headwind with respect to the UGV 1 (step S44: YES), the headwind is identified as the direction of the wind, and the processing proceeds to step S45. On the other hand, in a case where it is determined that there is no headwind with respect to the UGV 1 (step S44: NO), the UGV 1 stops at the receiving place while maintaining the vehicle direction in which the UGV 1 travels toward the receiving place of the article, and the processing proceeds to step S47.

In step S45, the control unit 15 determines the vehicle direction in which the receiving surface of the article is on the leeward side of the vehicle body 1a. Such a determination is preferably made after the UGV 1 stops at the receiving place while maintaining the vehicle direction in which the UGV 1 travels toward the receiving place of the article. Subsequently, the control unit 15 performs the vehicle direction control by outputting a control command corresponding to the vehicle direction determined in step S45 to the wheel drive mechanism by means of the vehicle direction control unit 154 (step S46). As a result, for example, as illustrated in FIG. 7, the UGV 1 changes the direction at the receiving place of the article so as to have the determined vehicle direction. Incidentally, the processing in steps S47 to S50 illustrated in FIG. 11 is similar to the processing in steps S9 to S12 illustrated in FIG. 9.

Example 4

Next, an operation of the delivery system S in Example 4 will be described with reference to FIG. 12. FIG. 12 is a flowchart illustrating an example of processing executed by the control unit 15 of the UGV 1 in Example 4. Incidentally, the processing in steps S61 to S66 illustrated in FIG. 12 is similar to the processing in steps S1 to S6 illustrated in FIG. 9.

In step S67, the control unit 15 determines whether or not the UGV 1 is in the vehicle direction determined in step S66. In a case where it is determined that the UGV 1 is not in the vehicle direction determined in step S66 (step S67: NO), the processing proceeds to step S68. On the other hand, in a case where it is determined that the UGV 1 is already in the vehicle direction determined in step S66 (step S67: YES), the processing proceeds to step S75.

In step S68, it is determined whether or not the authentication code is input from the recipient. In a case where it is determined that the authentication code is input from the recipient (step S68: YES), the processing proceeds to step S69. On the other hand, in a case where it is determined that the authentication code is not input from the recipient (step S68: NO), the processing returns to step S68. Incidentally, in a case where the authentication code is not input from the recipient even after a predetermined time has elapsed from the execution of the vehicle direction control, the UGV 1 may start moving toward the next delivery destination or the delivery station.

In step S69, the control unit 15 performs the authentication processing using the input authentication code and the authentication code registered in advance. When the authentication is successful in the authentication processing, the control unit 15 outputs a control command for unlocking the door 1d to the locking/unlocking mechanism by means of the door control unit 155 to perform unlocking (step S70). Subsequently, the control unit 15 causes the door 1d to be automatically opened by outputting a control command for opening the door 1d to the door drive mechanism by means of the door control unit 155 (step S71).

Subsequently, the control unit 15 outputs a control command for suppressing closing of the door 1d due to the influence of the wind to the door drive mechanism by means of the door control unit 155 to suppress closing of the door 1d (step S72). Subsequently, when the article is received by the recipient, the control unit 15 detects this, and outputs a control command for closing the door 1d to the door drive mechanism by means of the door control unit 155 to cause the door 1d to be automatically closed (step S73). Subsequently, the control unit 15 starts moving the UGV 1 toward the next delivery destination or the delivery station (step S74). Incidentally, the processing in steps S75 to S78 illustrated in FIG. 12 is similar to the processing in steps S68 to S71 illustrated in FIG. 12.

As described above, according to the above embodiment, the delivery system S identifies the direction of the wind blown onto the UGV 1, and suppresses, on the basis of the direction of the wind, closing of the door 1d, opened when the UGV 1 is stopped, due to the influence of the wind. As a result, it is possible to suppress unintentional closing of the door due to the influence of the wind when the recipient is to receive the article from the UGV 1. Therefore, it is possible to avoid hindering the receipt of the article by the recipient.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the method of identifying the direction of the wind blown onto the UGV 1 on the basis of the wind direction data (alternatively, motor output data and travel speed data) is provided, but the wind direction may be identified by detecting the load on the wheels 1b on the basis of the moment of the force on the vehicle body 1a due to the wind, instead of this method. In particular, if the omni wheels are used as the front wheels of the UGV 1, for example, the wind direction can be identified by detecting the load on the wheels 1b on the basis of the moment of the force on the vehicle body 1a due to the wind not only from the longitudinal direction but also from the lateral direction.

Moreover, in the above embodiment, the UGV is shown as an example of the unmanned vehicle, but the present invention can also be applied to, for example, a UAV (Unmanned Aerial Vehicle) or a flying robot capable of autonomously flying in the air in an unmanned manner, such as a drone and a multi-copter. For example, similarly to the UGV 1, the UAV includes a housing portion for housing an article, a sensor unit including an optical sensor, a wind sensor, and the like, and a control unit, and an openable and closable door is provided at an opening portion (receiving surface of the article) of the housing portion. Similarly to the UGV 1, the control unit of the UAV functions as a wind identification unit, a door closing suppression unit (corresponding to the vehicle direction control unit 154 and the door control unit 155 described above), and the like, to identify the direction of the wind blown onto the UAV, and suppresses, on the basis of the direction of the wind, closing of the door, opened when the UAV is stopped (for example, in a landing state), due to the influence of the wind. In particular, the control unit of the UAV controls the UAV, on the basis of the direction of the wind, so as to achieve the vehicle direction for suppressing closing of the door, opened when the UAV is stopped (for example, in a landing state), due to the influence of the wind. Such control is preferably performed in a state where the UAV is hovering. Furthermore, the control unit of the UAV may function as an appearance direction estimation unit and estimate the above-described recipient appearance direction. In this case, the control unit of the UAV controls the UAV on the basis of the wind direction and the recipient appearance direction so as to achieve the vehicle direction for suppressing closing of the door, opened when the UAV is stopped, due to the influence of the wind and for causing the receiving surface of the article to face the recipient side. Moreover, the control unit of the UAV may identify the direction of the wind by determining whether or not the wind is a headwind with respect to the UAV on the basis of a comparison between a ratio between output of a motor for flying the UAV (that is, a flying motor for rotationally driving a horizontal rotary blade) and flying speed of the UAV, and a reference ratio.

REFERENCE SIGNS LIST

1 UGV
1a Vehicle body
1b Wheels
1c Housing portion
1d Door
2 Management server
11 Positioning unit
12 Communication unit
13 Sensor unit
14 Storage unit
15 Control unit
151 Travel control unit
152 Wind identification unit
153 Appearance direction estimation unit
154 Vehicle direction control unit
155 Door control unit
S Delivery System

What is claimed is:

1. An unmanned vehicle for delivering an article, comprising:
   a housing portion for housing the article, the housing portion having an opening portion for receiving the article and being provided with an openable and closable door, the door being closeable on the opening portion;
   at least one memory configured to store program code; and
   at least one processor configured to access the program code and operate as instructed by the program code, the program code including:
      wind identification code configured to cause the at least one processor to identify a direction of wind blown onto the unmanned vehicle; and
      door closing suppression code configured to cause the at least one processor to, on the basis of the identified direction of the wind, control the unmanned vehicle so as to achieve a vehicle direction for suppressing closing of the door, due to an influence of the wind, when the door is open and the unmanned vehicle is stopped.

2. The unmanned vehicle of claim 1,
   wherein the wind identification code is further configured to cause the at least one processor to identify a strength of the wind blown onto the unmanned vehicle, and
   wherein the door closing suppression code is further configured to cause the at least one processor to, based on the strength of the wind being greater than or equal to a threshold, control the unmanned vehicle so as to achieve the vehicle direction for suppressing closing of the door, due to the influence of the wind, when the door is open and the unmanned vehicle is stopped.

3. The unmanned vehicle of claim 1,
   wherein the program code further includes appearance direction estimation code configured to cause the at least one processor to estimate an appearance direction in which a recipient of the article appears with reference to a receiving place of the article, and
   wherein the door closing suppression code if further configured to cause the at least one processor to control the unmanned vehicle, on the basis of the identified direction of the wind and the estimated appearance direction, so as to achieve the vehicle direction for suppressing closing of the door, due to the influence of the wind, when the door is open and the unmanned vehicle is stopped, and so that the opening portion faces the recipient.

4. The unmanned vehicle of claim 1, wherein the vehicle direction is a direction in which the opening portion is on a leeward side of a vehicle body of the unmanned vehicle in a stopped state.

5. The unmanned vehicle of claim 1,
wherein the wind identification code if further configured to cause the at least one processor to identify the direction of the wind by determining whether the wind is a headwind with respect to the unmanned vehicle on the basis of a comparison between a ratio between output of a motor for moving the unmanned vehicle and travel speed of the unmanned vehicle, and a reference ratio, and
wherein the door closing suppression code is further configured to cause the at least one processor to, based on the direction of the wind being identified as the headwind, control the unmanned vehicle so that the opening portion is on a leeward side of a vehicle body of the unmanned vehicle.

6. The unmanned vehicle of claim 1, further comprising a door drive mechanism configured to open and close the door,
wherein the door closing suppression code is further configured to cause the at least one processor to control the door drive mechanism, on the basis of the identified direction of the wind, so as to generate torque for suppressing closing of the door, due to the influence of the wind, when the door is open and the unmanned vehicle is stopped.

7. A delivery system comprising:
an unmanned vehicle for delivering an article; and
an information processing device,
wherein the unmanned vehicle includes a housing portion for housing the article, the housing portion having an opening portion for receiving the article and being provided with an openable and closable door, the door being closeable on the opening portion, and
wherein the information processing device includes:
at least one memory configured to store program code; and
at least one processor configured to access the program code and operate as instructed by the program code, the program code including:
wind identification code configured to cause the at least one processor to identify a direction of wind blown onto the unmanned vehicle; and
door closing suppression code configured to cause the at least one processor to, on the basis of the identified direction of the wind, control the unmanned vehicle so as to achieve a vehicle direction for suppressing closing of the door, due to the influence of the wind, when the door is open and the unmanned vehicle is stopped.

8. The unmanned vehicle of claim 1, wherein the vehicle direction is a direction in which the opening portion is on a windward side of a vehicle body of the unmanned vehicle in a stopped state.

9. The unmanned vehicle of claim 1, wherein the wind identification code is further configured to cause the at least one processor to, based on the identified direction of the wind, determine the vehicle direction for suppressing closing of the door that is opened when the unmanned vehicle is stopped, and to control the unmanned vehicle to face in the vehicle direction by rotating wheels of the unmanned vehicle and changing the direction of the wheels based on the vehicle direction.

10. The unmanned vehicle of claim 1, wherein the program code further includes authentication code configured to cause the at least one processor to perform authentication based on an authentication input, and to allow the door to be opened based on the authentication being successful.

* * * * *